United States Patent
Bedin et al.

(10) Patent No.: US 12,413,287 B2
(45) Date of Patent: Sep. 9, 2025

(54) DOPPLER-BASED BEAM TRAINING INTERVAL ADAPTATION

(71) Applicant: Nokia Solutions and Networks Oy, Espoo (FI)

(72) Inventors: Andrea Bedin, Espoo (FI); Paolo Baracca, Munich (DE); Karthik Upadhya, Espoo (FI); Mikko Aleksi Uusitalo, Espoo (FI); Martti Johannes Moisio, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 54 days.

(21) Appl. No.: 18/500,475

(22) Filed: Nov. 2, 2023

(65) Prior Publication Data

US 2024/0178902 A1    May 30, 2024

(30) Foreign Application Priority Data

Nov. 28, 2022  (WO) .................. PCT/IB2022/061497

(51) Int. Cl.
   *H04B 7/06*    (2006.01)
   *H04B 7/185*   (2006.01)

(52) U.S. Cl.
   CPC ....... *H04B 7/06958* (2023.05); *H04B 7/1855* (2013.01)

(58) Field of Classification Search
   CPC .............. H04B 7/06958; H04B 7/1855; H04B 7/06952; H04B 17/3911; H04B 17/3912;
   (Continued)

(56) References Cited

U.S. PATENT DOCUMENTS

| 8,379,745 B1 | 2/2013 | Nabar et al. | |
| 2009/0309787 A1* | 12/2009 | Gildea | G01C 21/3641 342/357.31 |

(Continued)

FOREIGN PATENT DOCUMENTS

| CN | 110601781 A | * 12/2019 | ........... H04B 17/391 |
| CN | 107484197 B | * 10/2020 | ......... H04B 17/3912 |
| WO | 2022/025808 A1 | 2/2022 | |

OTHER PUBLICATIONS

Extended European Search Report received for corresponding European Patent Application No. 23207255.3, Apr. 19, 2024, 8 pages.
(Continued)

*Primary Examiner* — Sophia Vlahos
(74) *Attorney, Agent, or Firm* — Nokia Technologies Oy

(57) ABSTRACT

According to an aspect, there is provided an apparatus for performing the following. The apparatus obtains predicted Doppler spectrum information for a propagation channel between a first terminal device and one of an access node or a second terminal device calculated using a radio-aware digital twin. The predicted Doppler spectrum information includes information on one or more Doppler frequencies of a predicted Doppler spectrum resulting from reflections from one or more terminal devices capable of movement under control of the digital twin. The apparatus causes performing of measurements of one or more reference signals by a device associated with the propagation channel to a form a channel estimate. The apparatus calculates a measured Doppler spectrum based on the channel estimate and filters out the one or more Doppler frequencies from it. The apparatus adjusts a beam refinement interval of the device based on the filtered measured Doppler spectrum.

17 Claims, 7 Drawing Sheets

(58) Field of Classification Search
CPC ............ H04B 17/3913; H04B 17/0087; H04L 25/0222; H04L 25/0228; H04L 25/0254
See application file for complete search history.

(56) References Cited

U.S. PATENT DOCUMENTS

| | | | | |
|---|---|---|---|---|
| 2013/0044610 | A1* | 2/2013 | Zhao | H04L 27/2647 370/252 |
| 2015/0054687 | A1* | 2/2015 | Reed | H04B 17/101 342/361 |
| 2021/0175986 | A1* | 6/2021 | He | H04B 17/364 |
| 2021/0314196 | A1 | 10/2021 | Yu et al. | |

OTHER PUBLICATIONS

Pan et al., "Joint DOA and Doppler frequency estimation for coprime arrays and samplers based on continuous compressed sensing", CIE International Conference on Radar (Radar), Oct. 10-13, 2016, 5 pages.

Wildemeersch et al., "Doppler radar and postprocessing techniques for small area surveillance", IEEE 10th Workshop on Signal Processing Advances in Wireless Communications, Jun. 21-24, 2009, pp. 549-553.

Pegoraro et al., "Multiperson Continuous Tracking and Identification From mm-Wave Micro-Doppler Signatures", IEEE Transactions on Geoscience and Remote Sensing, vol. 59, No. 4, Apr. 2021, pp. 2994-3009.

Yang et al., "Beam Tracking and Optimization for UAV Communications", IEEE Transactions on Wireless Communications, vol. 18, No. 11, Nov. 2019, pp. 5367-5379.

Scalabrin et al., "Beam Training and Data Transmission Optimization in Millimeter-Wave Vehicular Networks", IEEE Global Communications Conference (Globecom), Dec. 9-13, 2018, 7 pages.

International Search Report and Written Opinion received for corresponding Patent Cooperation Treaty Application No. PCT/IB2022/061497, dated Jun. 30, 2023, 13 pages.

Javed et al., "Reliable Communications for Cybertwin-Driven 6G IoVs Using Intelligent Reflecting Surfaces", IEEE Transactions on Industrial Informatics, vol. 18, No. 11, Nov. 2022, pp. 7454-7462.

* cited by examiner

DOPPLER-BASED BEAM TRAINING INTERVAL ADAPTATION

TECHNICAL FIELD

The systems and methods of the present disclosure relate to communications.

BACKGROUND

A beamforming-based communication system may require periodic or regular beam refinements to maintain connectivity with one or more terminal devices operating in an environment of mobility. Such mobility may relate to the terminal devices and/or to other objects (e.g., radiation sources and/or objects causing blockage and/or reflections) in the radio environment of the terminal devices. The beam refinement may be done either reactively (i.e., after a break in the communication link occurs) or proactively (i.e., before a break in the communication link occurs). The reactive refinement approach is disadvantageous in that the approach applies only after the communication link between the communication system and the terminal device may already be broken, such that, if a data packet is transmitted at that time, that data packet may be lost. The proactive refinement approach may prevent communication link disruptions; however, the proactive refinement may require additional processing overhead and may potentially run beam refinement even when the refinement is unnecessary.

SUMMARY

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, exemplary embodiments will be described with reference to the attached drawings, in which.

DETAILED DESCRIPTION OF SOME EMBODIMENTS

Figure 1:
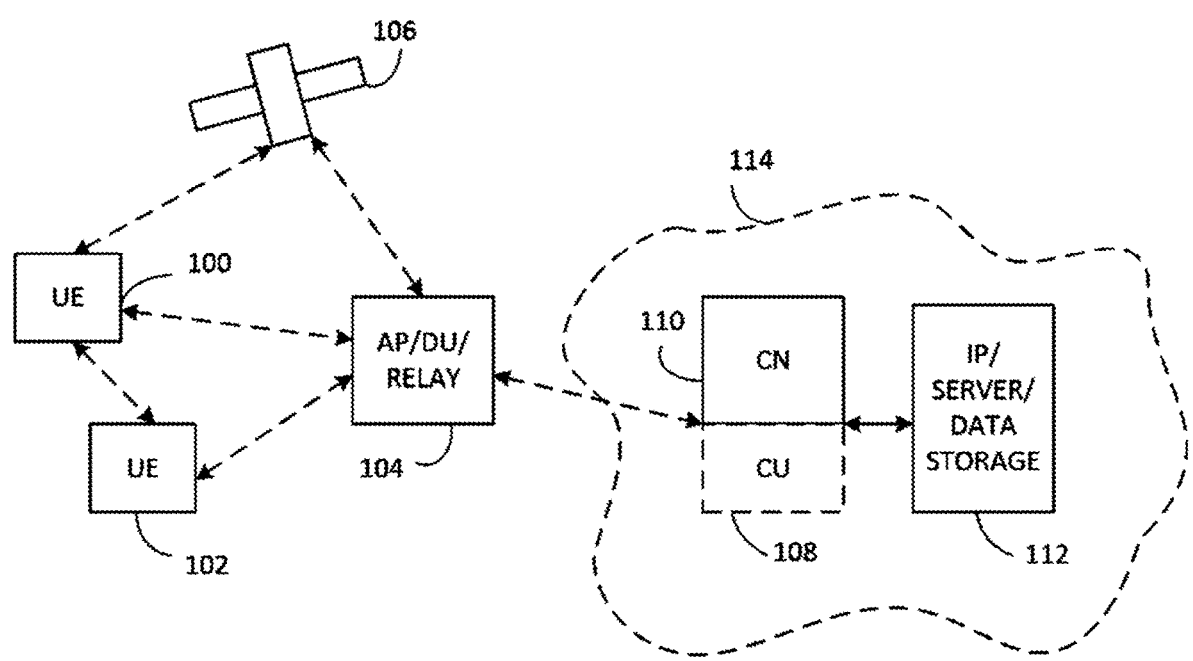
FIG. 1 illustrates an example wireless communication system.

The following embodiments are exemplary. Although the specification may refer to "an," "one," or "some" embodiment(s) in several locations, this does not necessarily mean that each such reference is to the same embodiment(s), or that the feature only applies to a single embodiment. Single features of different embodiments may also be combined to provide other embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements. Similarly, "one of the following: <a list of two or more elements>" and "one of <a list of two or more elements>" and similar wording, where the list of two or more elements are joined by "and" or "or," mean one of the elements.

In the following, the term "Doppler frequency" $f_D$ is defined as a frequency change due to the Doppler effect or Doppler shift. Specifically, the Doppler frequency $f_D$, as discussed in connection with embodiments, may correspond to Doppler frequency $f_D$ as observed by a receiver following a reflection of an electromagnetic wave transmitted by a transmitter from a moving object (or obstruction), where movement of the moving object is relative to the transmitter and/or receiver. The Doppler frequency $f_D$ may be defined according to Equation (1), such that $$f_D = 2f_0\frac{\bar{v}}{c}, \tag{1}$$

where $f_0$ is a frequency of a transmitted electromagnetic (e.g., radio) wave, c is the speed of light in vacuum (or air) and $\bar{v}$ is an amplitude of a component $\bar{v}$ of the velocity vector v of the moving object. In one example, the component $\bar{v}$ (equally called the radial component) of the velocity vector v is orthogonal to an edge of an ellipse defined such that the transmitter and the receiver are located at the two focal points of the ellipse and a reflecting surface of the moving object is arranged against an edge of the ellipse. The multiplier "2" in Equation (1) is indicative of the Doppler shift effect on both the electromagnetic wave incident upon the moving object as well as the electromagnetic wave reflected from the moving object. The Doppler frequency $f_D$ may be positive when the object is moving towards the transmitter and the receiver and may be negative when the object is moving away from the transmitter and the receiver.

In another example, the Doppler frequency $f_D$ may be generated, for a line-of-sight link, by the movement of the receiver with respect to the transmitter, as opposed to due to a reflection from a moving object in non-line-of-sight link as discussed in connection with Equation (1). In this case, the Doppler frequency $f_D$ may be defined according to Equation (2), such that $$f_D = 2f_0\frac{\bar{v}}{c}, \tag{2}$$

where $\bar{v}$ is the amplitude of the radial component $\bar{v}$ of the velocity v of the receiver with respect to the transmitter.

The term "digital twin" as used herein may be defined, in general, as a virtual representation of a certain physical environment (e.g., a factory) which may be used for predicting (e.g., simulating or predicting using a machine learning data-based approach) the status of that physical environment. In some instances, the digital twin may provide at least a virtual representation of a certain physical radio environment (i.e., a physical environment as detected, or "seen", by radio waves).

The digital twin may define, for example, the three-dimensional (3D) or two-dimensional (2D) geometry or model or map of the physical environment, material properties (e.g., permittivity, electrical conductivity and/or loss tangent) of materials present in the physical environment and possibly also operational status of any devices (e.g., terminal devices, access nodes, machinery and/or robots) in the physical environment. The prediction generated using the digital twin may span from production efficiency of a production line and machine failure times (e.g., for proactive maintenance) to radio resource usage and channel state information in accordance with the present disclosure.

Expressions having the form "filtering out a frequency from a Doppler spectrum" as used herein may correspond to applying a (digital) bandstop filter having a predefined (narrow) bandwidth upon the frequency in the Doppler spectrum. The bandstop filter may be applied, e.g., centrally relative to the frequency.

Expressions having the form "filtering out a frequency from a Doppler spectrum" may, additionally or alternatively, correspond to the removal, according to one or more predefined conditions, of one or more Doppler frequency components from a list of Doppler frequencies generated by the peak detection.

FIG. 1 illustrates examples of simplified system architectures only showing some elements and functional entities, all being logical units, whose implementation may differ from what is shown. The connections illustrated in FIG. 1 are logical connections; the actual physical connections may be different. It is apparent to a person skilled in the art that the system typically also includes other functions and structures than those shown in FIG. 1. The embodiments are not, however, restricted to the system given as an example; a person skilled in the art may apply the solution to other communication systems having necessary properties.

The example of FIG. 1 shows a part of an exemplifying radio access network. FIG. 1 shows user devices 100 and 102 configured to be in a wireless connection on one or more communication channels in a cell with an access node (such as (e/g)NodeB) 104 providing the cell. The physical link from a user device to an access node is called uplink or reverse link and the physical link from the access node to the user device is called downlink or forward link. It should be appreciated that (e/g)NodeBs or their functionalities may be implemented by using any node, host, server, or access point etc. entity suitable for such a usage. The access node 104 may be further connected to core network 110, in turn, connectable to one or more other networks 112. In an example, one or more operations of the core network 110 may be executed as a cloud service, or "cloud" 114. As discussed below, one or more functions being carried out in accordance with the example embodiments of the present disclosure may be executed in a distributed manner, such as using a distributed unit, DU of the access node 104, a centralized manner, such as using a centralized unit, CU 108, or some combination thereof.

The examples of the present disclosure relate to performing beam refinement in a beamforming-capable terminal device and/or in an access node. Thus, one or both of the user devices 100, 102 and/or the access node 104 may be configured to perform beamforming using at least one antenna array in reception and/or transmission.

As described above, any beamforming-based communication system requires periodic or regular beam refinements in order to maintain the communication connection under mobility. The beam refinement may be done either reactively or proactively. The latter alternative is often preferred as it is much more likely to prevent link disruptions. However, proactive beam refinement requires more overhead compared to reactive beam refinement and may necessitate running beam refinement at times even when it is not necessary. One simple way for implementing proactive beam refinement is to run the beam refinement procedure periodically according to a predefined period. The predefined period should be defined to work also in the worst-case scenario of very high mobility. This does guarantee high reliability, but also causes a large overhead.

In one example, if proactive beam refinement is implemented by running the procedure periodically with a constant update rate, two situations can occur. In one example, in an environment with little movement such that the state of the beams may be approaching a static state and/or the movements of the beams are controlled, the procedure may be redundant and unnecessary. In another example, in an environment where uncontrolled fast movements are present, the performance of the channel may be affected faster than the update period thereby causing a link disruption. These unfavorable scenarios may occur in the same environment at different times if the beam refinement rate is fixed (i.e., has a constant value).

Moreover, in cases where a radio-aware digital twin in a virtual environment is used for partially managing the network and the radio environment, some of the movements within the network might be planned not to interfere with the communication. Ignoring the digital twin and decreasing the beam refinement interval due to such planned movements may lead to unnecessary overhead.

The example apparatuses, systems and methods of the present disclosure provide adapting beam refinement to address these issues.

Figure 2A:
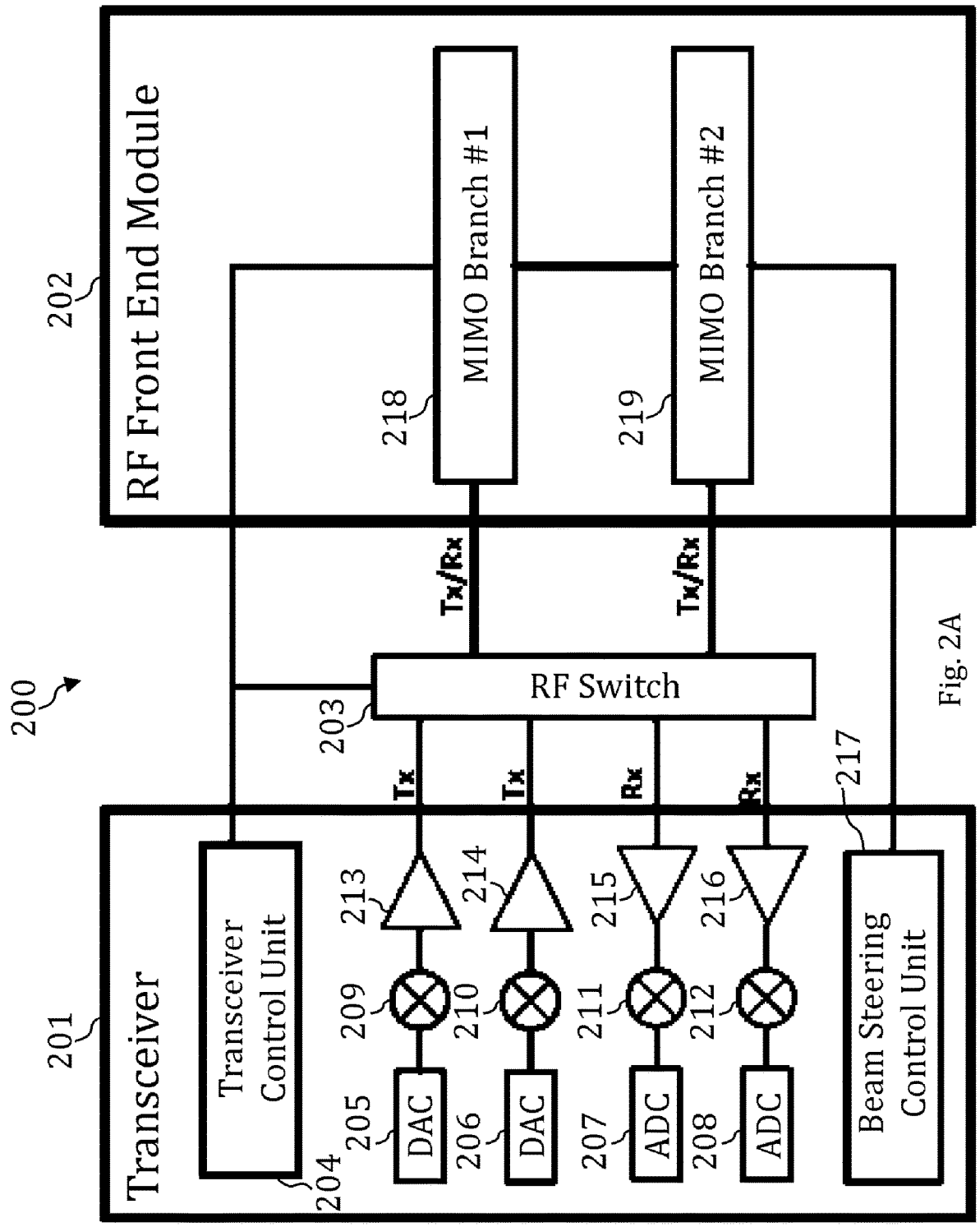
FIG. 2A illustrates an example apparatus in accordance with the present disclosure.
Figure 2B:
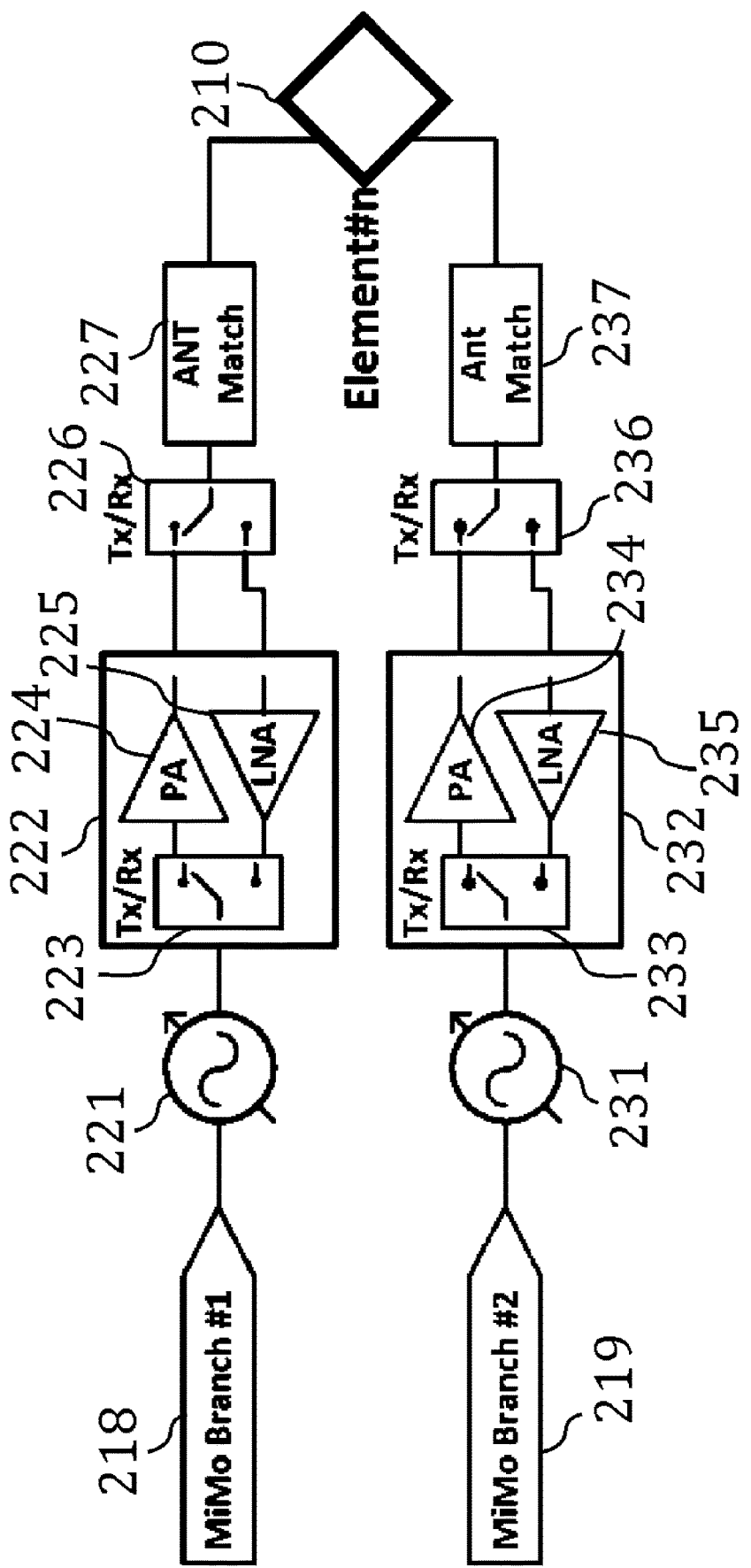
FIG. 2B illustrates an example apparatus in accordance with the present disclosure.

FIG. 2A illustrates an example beamforming (or MIMO) transceiver architecture 200 which may be configured to transmit and receive data over a wireless communication network (e.g., the network described in reference to at least FIG. 1) using multiple beams. FIG. 2B illustrates an example of a more detailed view of the two beamforming branches 218, 219 of FIG. 2A for feeding a single antenna element 210 of an antenna array of the beamforming transceiver 200. The example beamforming transceiver architecture 200 includes a transceiver 201 and an RF front end module 202.

In one example, the RF front end module 202 includes a plurality of RF elements 221 to 227, 231 to 237 for signal transmission and/or reception via each of a plurality of antenna elements 210 of the antenna array of the beamforming transceiver 201. FIG. 2B illustrates the plurality of RF elements 221 to 227, 231 to 237 only for a single antenna element 210 merely for simplicity of presentation. Corresponding RF elements may be provided for all antenna elements of the antenna array. The antenna array may be a one-dimensional antenna array (or a linear antenna array) or a two-dimensional antenna array. The example beamforming transceiver 200 may be a part of a terminal device and/or an access node, such as, for example, at least one of the terminal devices 100, 102 and/or the access node 104 described in reference to FIG. 1.

The baseband beamforming transceiver 201 may be communicatively coupled to the one or more RF front end modules 202 directly or via an RF switch 203. In other words, the RF switch 203 may be considered optional. Where the connection is made via the RF switch 203, the RF switch 203 may be configured to enable electric switching, by a transceiver control unit 204, for selecting which transmit signals are to be fed to which beamforming branches 218, 219 of which RF front end modules 202 and which receive signals received from the RF beamforming branches 218, 219 of the one or more RF front end modules 202 are to be fed to which Rx branches (i.e., branches formed by elements 207, 211, 215 and 208, 212, 216) of the baseband beamforming transceiver 201.

Each of the RF beamforming branches 218, 219 may correspond to a complete RF transceiver chain for a particular antenna element of the at least one antenna array. Corresponding RF beamforming branches may be provided, in the beamforming transceiver 201, for each antenna element of the antenna array (even though only the RF beamforming branches of a single antenna element is illustrated in FIG. 2). Thus, a set of corresponding RF beamforming branches 218, 219 for the plurality of antenna elements 210 (e.g., a set comprising all first RF beamforming branches 218 corresponding to the plurality of antenna elements) provides means for transmitting and receiving data signals using the whole antenna array and simultaneously with the transmission/reception occurring at other parallel RF beamforming branches 218, 219. Each set of corresponding RF beamforming branches 218, 219 feeding the plurality of antenna elements 210 may target at a time, for example, a specific cell or a specific user (if the beamforming transceiver 201 corresponds to an access node) or a specific access node (if the beamforming transceiver 201 corresponds to a terminal device). While only two RF beamforming branches 218, 219 are illustrated in FIG. 2, in other embodiments, a larger number of RF beamforming branches may be provided.

Referring to FIG. 2B, each RF beamforming branch 218, 219 may include, for example, a (complete) RF transceiver chain comprising at least an electrically tunable phase shifting element 221, 231, a power amplifier (PA)/low-noise amplifier (LNA) module 222, 232 and an antenna matching circuit 227, 237. Each PA/LNA module 222, 232 may include, for example, a power amplifier 224, 234 (for transmission) and a low-noise amplifier 225, 235 (for reception) and a pair of Tx/Rx switches 223, 233 for switching between one of the power and low-noise amplifiers 224, 234, 225, 235 depending on whether a signal is to be transmitted or received. Each RF transceiver chain 218, 219 may be connected to an antenna element 210 of the antenna array.

To transmit signals, the baseband beamforming transceiver 201 includes two or more digital-to-analog converters (DAC) 205, 206 configured to convert digital baseband signals to be transmitted to corresponding analog baseband signals, two or more transmitter mixers 209, 210 for converting the analog baseband signals output by the DAC 205, 206 to corresponding RF signals, and two or more transmitter amplifiers 213, 214 for amplifying the RF signal received from a corresponding transmitter mixer 209, 210. To receive signals, the baseband beamforming transceiver 201 includes two or more receiver amplifiers 215, 216 for amplifying the received RF signals, two or more receiver mixers 211, 212 for converting the received RF signals to corresponding analog baseband signal and two or more analog-to-digital converters (ADC) 207, 208 for converting the analog baseband signals to corresponding digital baseband signals.

The transceiver control unit 204 may be configured to control whether the beamforming transceiver 201 is in a transmission or reception mode (e.g., by controlling the RF switch 203 and Tx/Rx switches of the one or more RF front end modules 202). A beam steering control unit 217 of the beamforming transceiver 201 may be configured to control the beamforming operations (e.g., adjusting phase shifts applied in each RF beamforming branch for each antenna element). The transceiver control unit 204 and the beam steering control unit 217 may be separate computing devices or comprised in a single computing device. The operations according to embodiments described in reference to FIGS. 3 to 6 may, in some instances, be carried out by the beam steering control unit 217.

It should be emphasized that only some of the elements and functional entities of the baseband beamforming transceiver 201 are illustrated in FIGS. 2A and 2B. It is apparent to a person skilled in the art that the system may also include functions and structures other than, i.e., in addition to and/or different from, those shown in FIGS. 2A and/or 2B. For example, the baseband beamforming transceiver 201 may further include one or more digital baseband processing units configured to process digital baseband signals before transmission and/or after reception, one or more local oscillators configured to provide a local oscillator signal for the mixers 209-212 for generating an analog baseband signal or a RF signal of a desired frequency, and/or one or more analog and/or digital filters.

In some instances, the baseband transceiver employed may differ from the one illustrated in FIGS. 2A and 2B in other ways. In general, the baseband beamforming transceiver 201 may include one or more digital and/or analog units as commonly found in MIMO-enabled or beamforming transceivers. The one or more digital and/or analog units may be configured to perform, for example, digital/analog baseband processing, beam steering control, channel estimation, MIMO detection, precoding, spatial multiplexing and/or time- and/or frequency-scheduling.

In one example, the beamforming transceiver 201 may not be MIMO-enabled and, thus, only a single transmission baseband processing chain 205, 209, 213, only a single reception baseband processing chain 207, 211, 215 and only a single RF branch 218 per antenna element may be provided. In some embodiments, only beamforming transmission or beamforming reception may be enabled in the terminal device. In other words, the terminal device may include only a beamforming transmitter or a beamforming receiver (not a beamforming transceiver as in FIG. 2A).

Figure 3:
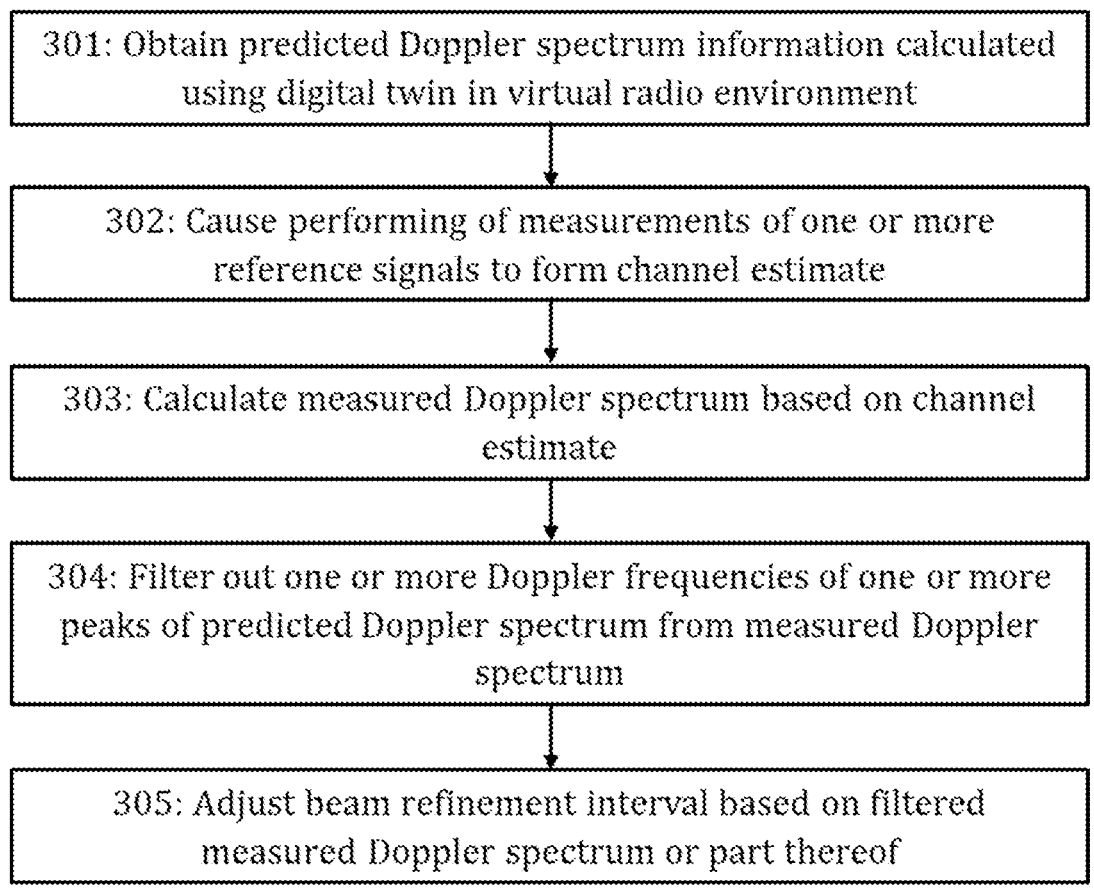
FIGS. 3 to 6 illustrate example processes in accordance with the present disclosure.

FIG. 3 illustrates a process according to embodiments for dynamically adjusting a beam refinement interval for a plurality of antenna elements of a terminal device or an access node. The terminal device (also referred to as, a first terminal device) whose beam refinement interval is to be adjusted may be configured to communicate, over a propagation channel, with an access node or with a second terminal device while the access node whose beam refinement interval is to be adjusted may be configured to communicate, over a propagation channel, with a (first) terminal device. The illustrated process may be performed by the access node or the terminal device, such as one of the terminal devices 100, 102 and/or the access node 104 of FIG. 1, or by an apparatus, such as a computing device, forming a part of or connected to the terminal device or the access node. The terminal device and/or the access node may operate in a physical environment including one or more (terminal) devices capable of movement under control of the radio-aware digital twin. The terminal device and/or the access node is assumed to be configured to perform beamforming in reception and/or transmission. In some embodiments, the apparatus for a terminal device and/or the access node may be the beam steering control unit 217 of the beamforming transceiver 201 of FIG. 2A. In the following, the entity carrying out the process is called "an apparatus" without loss of generality.

Referring to FIG. 3, the (first/second) terminal device or the access node whose beam refinement interval is to be adjusted is configured to carry out transmission and/or reception of radio signals using a beam generated via beamforming. Moreover, the (first/second) terminal device or the access node whose beam refinement interval is to be adjusted may be configured to adjust or adapt the beam (i.e., to adjust beamforming coefficients or weights affecting the phase shift applied at each antenna element of the antenna array) at regular intervals defined by a beam refinement interval. The information on the beam refinement interval may be maintained in a memory of the apparatus of the (first/second terminal) device and/or the access node.

The process of FIG. 3 is initiated by the apparatus obtaining, in block 301, predicted Doppler spectrum information for a propagation channel between a first terminal device and one of an access node or a second terminal device. In other words, the obtained predicted Doppler spectrum information (as well as the present process in general) relates to a propagation channel (or a communication link) between a first terminal device and an access node or to a propagation channel (or a communication link) between first and second terminal devices. In one example, the received predicted Doppler spectrum information may be determined using a digital twin. In other words, the digital twin defines a virtual environment emulating or representing at least the physical environment of which the first terminal device and the one of the access node and the second terminal device) is a part. The virtual environment may emulate the physical environment at least in terms of properties relevant for radio wave propagation. The physical environment may correspond to an interior/indoor or exterior/outdoor space.

In some embodiments, the predicted Doppler spectrum information obtained in block 301 may be or comprise simulated Doppler spectrum information determined using the digital twin.

The digital twin may be a radio-aware digital twin, i.e., a digital twin which is aware of the locations, trajectories, and optionally other relevant properties of one or more terminal devices within the physical (radio) environment.

The one or more devices capable of movement under the control of the radio-aware digital twin may include one or more terminal devices (of a radio access network) and/or one or more non-terminal devices. Moreover, in some embodiments, the digital twin may be able to control the movement of the terminal device associated with the obtained predicted Doppler spectrum information.

The predicted Doppler spectrum information obtained in block 301 includes at least information on one or more Doppler frequencies of a predicted Doppler spectrum defined for the propagation channel. The one or more Doppler frequencies may correspond to one or more peaks of the predicted Doppler spectrum. A peak may be defined, here and in the following, as a local maximum. The one or more Doppler frequencies may correspond to peaks satisfying one or more predefined criteria (e.g., exceeding a predefined level). A peak may be also referred to as a Doppler component.

The predicted Doppler spectrum information may relate to a virtual propagation channel between a virtual representation of the first terminal device (i.e., a first virtual terminal device) and a virtual transmitter/receiver (representing a virtual serving access node of the terminal device or a second virtual terminal device).

At least one of the one or more Doppler frequencies of the predicted Doppler spectrum obtained in block 301 may correspond to a reflection from an object or device moving within the virtual environment with the respect to the first virtual terminal device and/or to a virtual transmitter/receiver in communication with the first virtual terminal device.

One of the one or more Doppler frequencies of the predicted Doppler spectrum obtained in block 301 may correspond to a line-of-sight communication path. Depending on whether or not the first virtual terminal device and virtual transmitter/receiver in communication with the first virtual terminal device are moving relative to each other, this peak/Doppler component may correspond to a zero Doppler frequency or to a non-zero Doppler frequency. In some cases, this peak or Doppler component may coincide, in Doppler frequency, with one or more peaks or Doppler components of the predicted Doppler spectrum corresponding to reflections from an object or device stationary within the virtual environment with the respect to the first virtual terminal device and the virtual transmitter/receiver in communication with the first virtual terminal device.

The one or more Doppler frequencies of the one or more peaks of the predicted Doppler spectrum correspond to one or more Doppler frequencies resulting from reflections from one or more moving devices which are known by the digital twin not to be harmful for the communication of the terminal device. In an example, the one or more Doppler frequencies of the one or more peaks of the predicted Doppler spectrum correspond to one or more Doppler frequencies resulting from reflections from one or more currently moving devices and/or objects (e.g., one or more robots in a factory environment, or structural elements such as walls and pillars that are static relative to one or more devices or objects in the environment, but are moving relative to the first and/or second terminal device(s) and/or the access node) which are under control of the digital twin (e.g., under control of a second apparatus using the digital twin). The movement of a device or an object producing a Doppler component may be relative movement with the respect to the first virtual terminal device and to the virtual access node or the second virtual terminal device (which does not necessarily imply absolute movement of the device producing the Doppler component). It may be assumed any such moving devices under the control of the digital twin do not pose a threat to the communication of the terminal device as the digital twin is able to plan the path of such devices so as not to interfere with the terminal device and/or to notify the network before any disruptions. The digital twin and how the predicted Doppler spectrum information may be derived using the digital twin is discussed in further detail in connection with FIG. 5.

In some embodiments, the predicted Doppler spectrum information may be specific to a certain frequency band of the (first/second) terminal device or multiple frequency bands at least some of which are supported by the devices associated with the propagation channel (i.e., the first terminal device, the second terminal device and/or the access node). In the latter case, the predicted Doppler spectrum information may relate to a predicted Doppler spectrum averaged over multiple frequency bands.

In some embodiments, the predicted Doppler spectrum information may include a (full) predicted Doppler spectrum calculated using the digital twin. In such embodiments, the apparatus may detect the one or more peaks (as defined in reference to at least FIG. 3) from the predicted Doppler spectrum.

In some embodiments, the obtaining of the predicted Doppler spectrum information in block 301 includes receiving the predicted Doppler spectrum information from a second apparatus (being, e.g., a computing device or a server) over at least one communication network and/or at least one communication link. The second apparatus may be configured to perform calculations (or simulations or predictions) using the digital twin, for example, for calculating the aforementioned predicted Doppler spectrum. The at least one communication network may include one or more wired communication networks (e.g., the Internet) and/or one or more wireless communication networks. The at least one communication link may include one or more wired communication links and/or one or more wireless communication links. For example, the second apparatus may correspond to or be comprised in element 112 of FIG. 1.

The apparatus causes, in block 302, performing of measurements of one or more reference signals by a device associated with the propagation channel in order to form a channel estimate for the propagation channel. The measurements are carried out over the propagation channel. Here and in the following, the device associated with the propagation channel is either the first terminal device or the one of the access node or the second terminal device (i.e., the one associated with the propagation channel for which predicted Doppler spectrum information was obtained in block 301). The apparatus carrying out the process of FIG. 3 may be or form a part of or be communicatively connected to the device associated with the propagation channel. The measurements may be performed for at least one radio frequency band. When the measurements are performed by the first terminal device, the one or more reference signals may be transmitted by the access node (which may be the serving access node of the terminal device) or the second terminal device. When the measurements are performed by the second terminal device, the one or more reference signals may be transmitted by the first terminal device. When the measurements are performed by the access node, the one or more reference signals may be transmitted by the first terminal device. The one or more reference signals may include, for example, one or more demodulation reference signals (DMRSs), one or more channel state information reference signals (CSI-RSs), one or more positioning reference signals (PRSs) and/or one or more sounding reference signals (SRSs).

The apparatus calculates, in block 303, a measured Doppler spectrum based on the channel estimate. In one example, the measured Doppler spectrum may be calculated using a Fourier transform (or discrete Fourier transform or fast Fourier transform) or any other spectral estimation method such as Multiple Signal Classification (MUSIC), Estimation of Signal Parameters via Rotational Invariance Technique (ESPRIT) and/or Welch periodogram. It is obvious to a skilled person that other Doppler estimation methods might be used. The predicted and measured Doppler spectra may relate both to the same propagation channel between the first terminal device and the one of the access node or the second terminal device.

In some embodiments, the actions pertaining to block 301 may be carried out after the actions relating to block 302 and/or block 303.

The apparatus filters out, in block 304, the one or more Doppler frequencies of the predicted Doppler spectrum from the measured Doppler spectrum. The filtering of the Doppler frequencies may be performed considering a predefined uncertainty in the Doppler frequency prediction and estimation.

The one or more Doppler frequencies of the one or more peaks of the predicted Doppler spectrum may be assumed to correspond to moving objects under control of the digital twin and are thus no cause for concern in view of disruptions of the propagation channel, and therefore of the communication channel. Thus, the filtered measured Doppler spectrum acquired via the filtering in block 304 may include (or consist of) a zero-Doppler-frequency Doppler component and one or more anomalous Doppler components being Doppler components resulting from reflections from moving objects not controlled by the digital twin.

In some embodiments, the apparatus may further filter out, in block 304, the Doppler frequency of the predicted Doppler spectrum corresponding to the line-of-sight communication path from the measured Doppler spectrum (assuming it was obtained in block 301). Additionally or alternatively, the apparatus may filter out, in block 304, the zero frequency from the measured Doppler spectrum.

In some embodiments, the apparatus may store the measured Doppler spectrum and/or the filtered measured Doppler spectrum to a memory.

The apparatus adjusts, in block 305, a beam refinement interval of the device associated with the propagation channel (i.e., the first terminal device, the second terminal device or the access node) based on the filtered measured Doppler spectrum or at least a part thereof (e.g., one or more peaks thereof). Subsequently, the apparatus may perform beam refinement according to the adjusted beam refinement interval.

In some embodiments, the apparatus may cause transmitting information on all or at least one of the one or more peaks of the filtered measured Doppler spectrum to the second apparatus over the at least one communication network and/or the at least one communication link. The transmitted information comprise information on one or more Doppler frequencies (or one or more positive Doppler frequencies) of one or more respective peaks of the filtered measured Doppler spectrum and/or one or more amplitudes of one or more respective peaks of the filtered measured Doppler spectrum.

The process of FIG. 3 may be repeated periodically or regularly (i.e., according to a predefined schedule). During these repetitions, block 301 may not always be repeated along with blocks 302 to 305, that is, the Doppler spectrum information obtained in block 301 may be employed for multiple repetitions of blocks 302 to 305 before it is obtained again. In other words, blocks 301 to 305 may be repeated according to a first timer while blocks 302 to 305 may be repeated according to a second timer, where the first timer has a longer period than the second timer.

It should be noted that, in at least block 305 of FIG. 3, it is assumed that the filtered measured Doppler spectrum has a form necessitating adjustment of the beam refinement interval. For example, the filtered measured Doppler spectrum may include one or more Doppler components (i.e., peaks) which had not been observed previously or one or more of the previously observed Doppler components had moved in terms of Doppler frequency in the (most recent) filtered measured Doppler spectrum. However, this may not always be the case. For example, if the filtered measured Doppler spectrum is substantially the same as a previously calculated filtered measured Doppler spectrum or at least the Doppler component having the highest Doppler frequency is substantially the same as in the previously calculated filtered measured Doppler spectrum, there may be no need to adjust the beam refinement interval, as discussed also in connection with FIG. 6.

Figure 4:
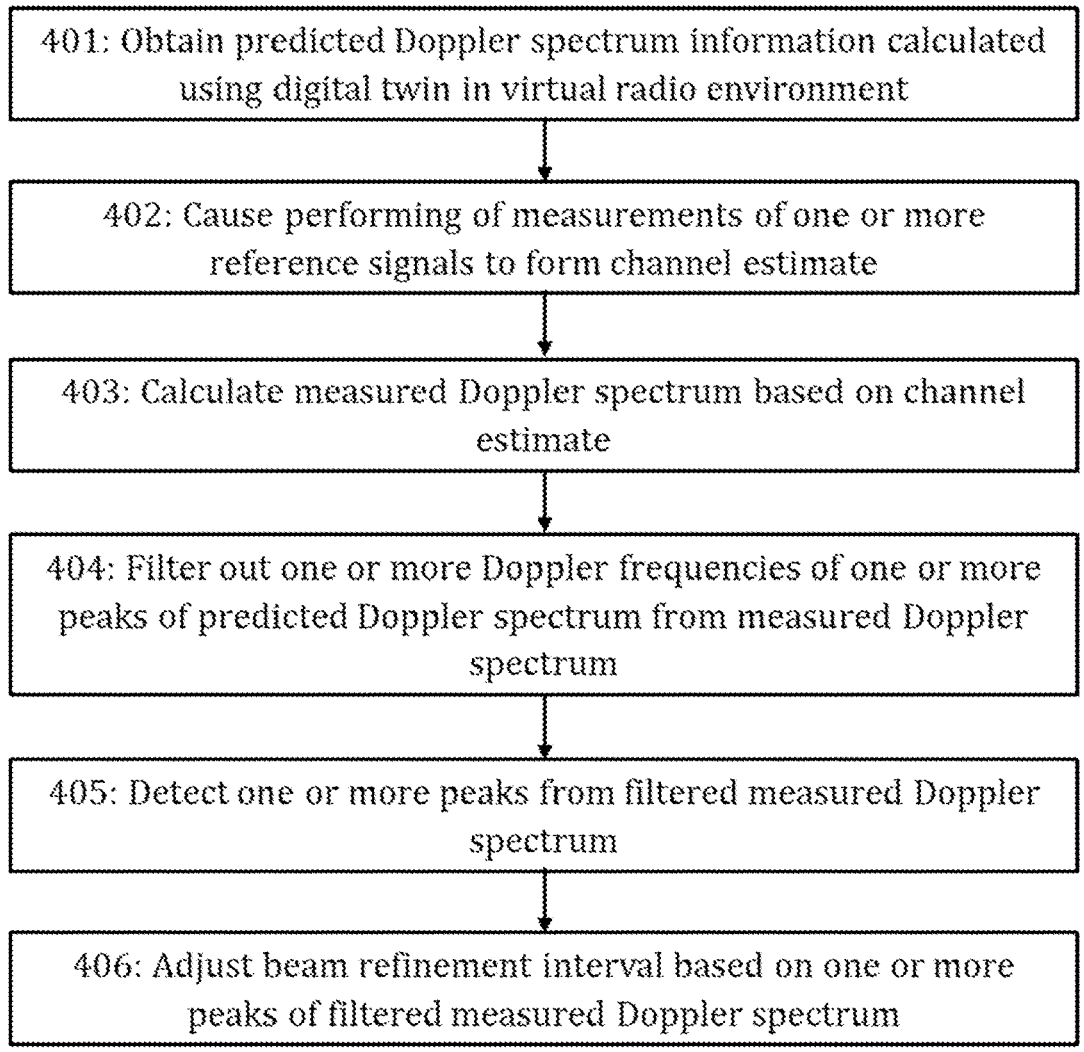

FIG. 4 illustrates another process according to embodiments for dynamically adjusting a beam refinement interval of a terminal device or an access node. The terminal device (equally called a first terminal device) whose beam refinement interval is to be adjusted may be configured to communicate, over a propagation channel, with an access node or with a second terminal device while the access node whose beam refinement interval is to be adjusted may be configured to communicate, over a propagation channel, with a (first) terminal device. The illustrated process may be performed by a terminal device or an access node such as one of the terminal devices 100, 102 and/or the access node 104 of FIG. 1 or by an apparatus such as a computing device comprised in or connected to the terminal device or the access node. The terminal device and/or the access node may operate in a physical environment including one or more (terminal) devices capable of movement under control of the radio-aware digital twin. The terminal device is assumed to be configured to perform beamforming in reception and/or transmission. In some embodiments, the apparatus for the terminal device and/or the access node may be the beam steering control unit 217 of the beamforming transceiver of FIG. 2A. In the following, the entity carrying out the process is called "an apparatus" without loss of generality.

The process of FIG. 4 corresponds for the most part to the process of FIG. 3. Namely, blocks 401 to 404 of FIG. 4 may correspond fully to blocks 301 to 304 of FIG. 3, respectively, and are, thus, not discussed here in detail for brevity. In a manner described with reference to block 302 of FIG. 3, the apparatus may cause, in block 402, performing of measurements of the one or more reference signals by a device associated with the propagation channel which is either the first terminal device or one of the access node or the second terminal device (i.e., the one associated with the propagation channel for which predicted Doppler spectrum information is obtained in block 401).

Following the filtering out of the one or more Doppler frequencies of the one or more peaks of the predicted Doppler spectrum from the measured Doppler spectrum in block 404, the apparatus detects, in block 405, from the filtered measured Doppler spectrum, one or more peaks having a non-negative Doppler frequency (or alternatively having a positive Doppler frequency or, in some cases, even having any Doppler frequency). The peak with a zero Doppler frequency may correspond to a combination of the line-of-sight propagation path and/or one or more non-line-of-sight propagation paths corresponding to reflections from stationary objects (at least when the first terminal device and the one of the access node or the second terminal are not moving relative to each other) while peaks with a positive Doppler frequency may correspond to objects moving towards the first terminal device and/or the one of the access node or the second terminal device.

In some embodiments, the apparatus may store Doppler frequencies and/or amplitudes of the one or more detected peaks to a memory.

In some embodiments, the detecting of the one or more peaks in block 405 may be carried out so that the one or more detected peaks include any peaks of the filtered measured Doppler spectrum having a non-negative Doppler frequency and an amplitude satisfying one or more predefined peak detection criteria. The one or more predefined peak detection criteria may include a predefined minimum level for an amplitude of a peak and/or one or more predefined minimum levels for one or more normalized amplitudes of a peak. Here, the one or more normalized amplitudes may be normalized, for example, with an amplitude of a zero-Doppler-frequency peak of the filtered measured Doppler spectrum and/or with a level of the noise floor in the filtered measured Doppler spectrum.

The apparatus adjusts, in block 406, a beam refinement based on at least one of the one or more peaks of the filtered measured Doppler spectrum. The general principle in the adjusting of the beam refinement interval in block 406 may be that peaks having a high Doppler frequency necessitate use of a short beam refinement interval while peaks having a lower Doppler frequency may enable use of a longer beam refinement interval.

In some embodiments, the adjusting in block 406 may be carried out based on all of the one or more peaks of the filtered measured Doppler spectrum.

In some embodiments, the adjusting of the beam refinement interval in block 406 may be based on one or more Doppler frequencies of the one or more peaks of the filtered measured Doppler spectrum and/or one or more amplitudes of the one or more peaks of the filtered measured Doppler spectrum.

In some embodiments, the adjusting of the beam refinement interval in block 406 may be further based on one or more peaks of the predicted Doppler spectrum not found in the measured Doppler spectrum.

In some embodiments, the adjusting of the beam refinement interval in block 406 may be based at least on a highest Doppler frequency among the one or more peaks of the filtered measured Doppler spectrum detected in block 405.

In some embodiments, the adjusting of the beam refinement interval in block 406 may include calculating (and setting) a new value for the beam refinement interval T according to $$T = \frac{c}{f_{max}}, \qquad (3)$$

wherein $f_{max}$ is the highest Doppler frequency among the one or more peaks of the filtered measured Doppler spectrum and c is a speed of light in vacuum (or air). Notably, if the one or more peaks of peaks of the filtered measured Doppler spectrum consist only of a zero Doppler frequency peak, the beam refinement interval T is set to infinity (or in practice, to a very large number) meaning that no beam refinement will be carried out (at least not until the next update of the beam refinement interval). On the other hand, if the highest Doppler frequency is very high indicating that an object is moving fast towards the first terminal device and/or the one of the access node or the second terminal device, the beam refinement interval Tis set to a very low value so as to be able to dynamically adapt the beam to a rapidly changing radio environment.

It should be noted that the relative movement of an unknown object or obstruction producing an anomalous Doppler component (i.e., producing a peak of the filtered measured Doppler spectrum detected in block 405) may be relative movement with respect to the first terminal device and/or the one of the access node or the second terminal device which does not necessarily imply absolute movement of the unknown object. This makes the proposed solution especially robust as it can take into account any kind of mobility in the physical environment. Moreover, the Doppler frequency of a given Doppler component is, in general, directly proportional to a component of the velocity vector of the moving object orthogonal to an ellipse defined so that the transmitter (i.e., the access node or the second terminal device) and the receiver (i.e., the first terminal device) act as focal points of the ellipse, as described in reference to at least Equation (1). Consequently, the Doppler frequency provides a very good indication on how quickly the (unknown) object is approaching the line of sight, and naturally ignores movements in other directions.

Figure 5:
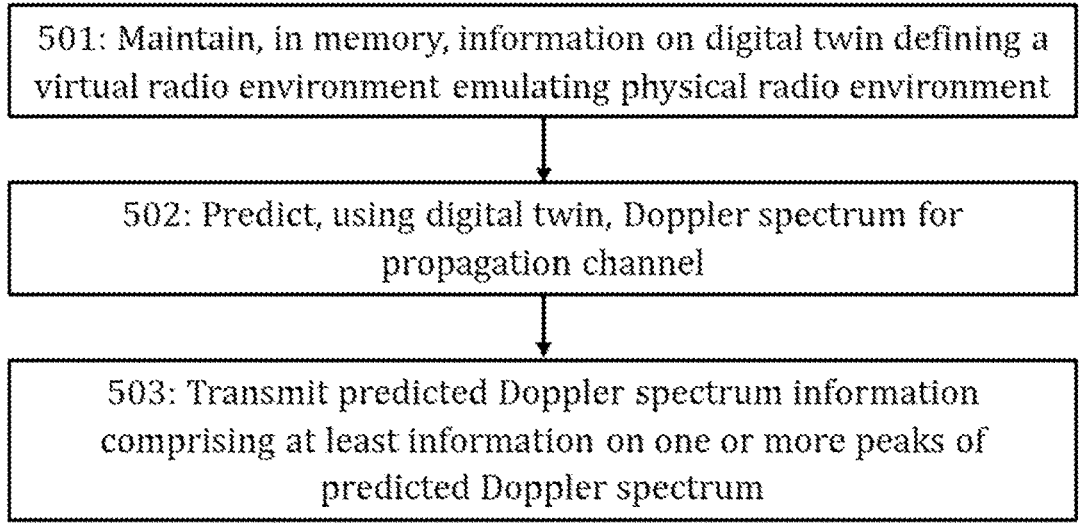

As was described in reference to at least FIGS. 3 to 4, the embodiments are based on employing Doppler spectrum information derived using a (radio-aware) digital twin for the physical (radio) environment. FIG. 5 provides further information regarding the use of the digital twin. Namely, FIG. 5 illustrates a process according to embodiments for calculating predicted Doppler spectrum information for a propagation channel between a first terminal device and one of an access node or a second terminal device and transmitting the information to the first terminal device or to the one of the access node or the second terminal device. The illustrated process may be performed by an apparatus such as a computing device or a server. The apparatus (equally called a second apparatus as was done in connection with FIGS. 3 to 4) may form a part of the element 112 of FIG. 1. The (first/second) terminal device or the access node is assumed to be configured to perform beamforming in reception and/or transmission. In some embodiments, the apparatus for a (first or second) terminal device or the access node may be the beam steering control unit 217 of the beamforming transceiver of FIG. 2A.

Referring to FIG. 5, the apparatus initially maintains, in block 501, in a memory, information on a digital twin for a physical environment. The physical environment may include at least a first terminal device and one of an access node (being a serving access node of the first terminal device) or a second terminal device. The physical environment includes also one or more (terminal) devices capable of movement under control of the radio-aware digital twin. In some embodiments, the physical environment may correspond to an internal space (i.e., an interior) such as a particular building or a part thereof. In general, the physical environment may be defined here as in previous embodiments.

In one example, the information on the digital twin maintained in the memory in block 501 may include one or more of the following: a 2D or 3D model or map of the physical environment, material properties (especially electromagnetic material properties comprising, e.g., permittivity, permeability, electrical conductivity and/or loss tangent) of materials present in the physical environment, RAN information for the physical environment, device information for the physical environment and/or one or more radio environment maps of the physical environment.

The RAN information may, in general, include information on one or more access nodes of a radio access network comprising at least the serving access node of the first terminal device. The RAN information for a given access node may include, for example, a location of the access node and optionally a trajectory of the access node (if it is a moving access node). The location and/or the trajectory may be provided in two or three dimensions. The RAN information for a given access node may further include information on capabilities of the access node (e.g., supported frequency bands, supported transmission modes and transmit power), one or more beam patterns usable and/or currently used by the access node and one or more radio resource management (RRM) algorithms used by the access node.

The device information may include, for example, information on locations and trajectories of one or more terminal device of the radio access network comprising the first terminal device and optionally the second terminal device and/or on locations and trajectories of one or more non-terminal devices. The location and/or the trajectory may be provided in two or three dimensions. The device information for a given device (e.g., the first terminal device, the second terminal device and/or the access node) may further include information on capabilities of the device (e.g., supported frequency bands, supported transmission modes and transmit power), one or more beam patterns usable and/or currently used by the device and one or more radio resource management (RRM) algorithms used by the access node.

Each of the one or more radio environment maps (REMs) provides at least information on radio link quality within the virtual environment (and thus also within the physical environment). The radio link quality may be quantified, in the one or more REMs, by providing values of one or more radio link quality metrics within the virtual environment. The one or more radio link quality metrics may include, for example, a reference signal received power (RSRP) and/or a signal-to-interference-plus-noise (SINR). Each data point or "pixel" of the one or more REMs may correspond to an (average, weighted average or median) radio link quality (e.g., RSRP or SINR) within a certain $I_1 \times I_2$ area, where $I_1$ and $I_2$ are lengths in meters along two orthogonal directions. For example, $I_1$ and $I_2$ may have a value of 5 meters.

All or at least some of the information maintained in the memory in block 501 may be updated periodically or regularly.

The physical environment and thus also the virtual environment may correspond to a controlled environment such as a private industrial network within, e.g., a factory, a warehouse, a port, a mine or an airport. In such controlled environment, all or most operations may be, at least partly, planned and/or under supervision. In an example, the positions of the one or more devices within the controlled environment may be fully controllable both in time and place. Thus, no or minimal randomness may exist in such a controlled environment, mobility may be deterministic, and the trajectories of the devices may be fixed. Moreover, the capabilities of the one or more (terminal) devices within the controlled environment may be fully known and be controllable by the apparatus carrying out the process of FIG. 5. Standardized features (e.g., 3GPP UE categories and capabilities like supported transmission modes and bands), proprietary features like antenna design of the one or more terminal devices and/or possible other implementation specific algorithms may be known to the apparatus and maintained in its memory in these embodiments. In some such controlled environments, all of the one or more devices may even have identical properties or the one or more devices may be divided into N groups with known identical properties for facilitating the network and performance planning (N being an integer larger than one). In some embodiments, the one or more devices of the controlled environment may be all terminal devices.

The apparatus predicts, in block 502, using the digital twin (i.e., using at least some of the information described in connection with block 501), a Doppler spectrum for a propagation channel between the first terminal device and the one of the access node or the second terminal device. The predicting in block 502 may be carried out for at least one radio frequency band. The predicting in block 502 may, e.g., correspond to simulating (i.e., performing one or more simulations). The predicting (or simulating) in block 502 may be carried out, for example, using an electromagnetic field solver such as a ray tracing-based electromagnetic field solver.

The predicted Doppler spectrum may be calculated in block 502 starting from a 3D model of the physical environment (and associated material properties), for example, by, first, finding a set of one or more most prominent (line-of-sight/non-line-of-sight) propagation paths between a virtual terminal device and its serving virtual access node or two virtual terminal devices (e.g., using ray tracing or some other electromagnetic field solver) and, then, determining length variations of the set of one or more most prominent propagation paths as one or more devices (e.g., robots) which are under control of the digital twin move. This procedure is enabled by the fact that the digital twin is aware of all the positions and velocities (and possibly rates of acceleration) of the movable devices that are modelled.

In some embodiments, data-based and/or machine learning-based methods may be used, as a complementary or alternative approach, to predict the Doppler spectrum using the digital twin. For example, in a factory where one or more robots perform a particular task periodically, their contribution to the Doppler spectrum may be measured once and the measurement and the knowledge of the periodicity of the task may be used for predicting the Doppler spectrum in the future (without additional measurements) thus simplifying the process of predicting the Doppler spectrum.

The apparatus transmits, in block 503, to a device associated with the (predicted) propagation channel, predicted Doppler spectrum information comprising at least information on one or more peaks of the predicted Doppler spectrum resulting from reflections from at least one of the one or more devices under control of the digital twin (e.g., at least Doppler frequencies of the one or more peaks). The device associated with the propagation channel is the first terminal device or the one of the access node or the second terminal device. The at least one of the one or more devices may be assumed to be currently moving and thus producing a Doppler component with a non-zero Doppler frequency. The apparatus may detect the one or more peaks from the predicted Doppler spectrum similar to as described in connection with block 405 of FIG. 4 for the filtered measured Doppler spectrum. In general, any of the definitions for the predicted Doppler spectrum information described in connection with block 301 of FIG. 3 may apply equally here.

Figure 6:
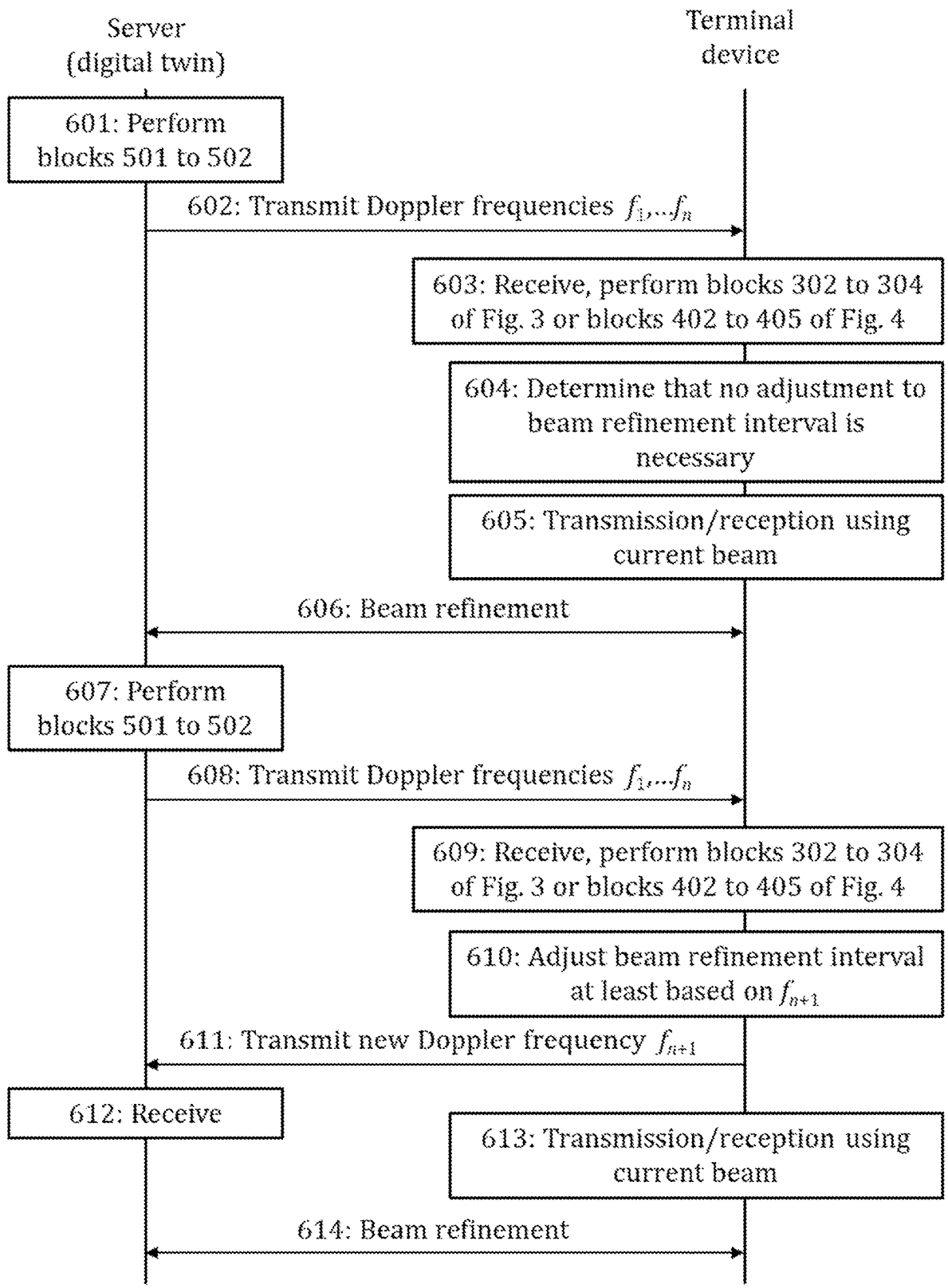

FIG. 6 illustrates signaling between a server maintaining a digital twin for a physical (radio) environment and a terminal device located in the physical (radio) environment. FIG. 6 illustrates a process according to embodiments for calculating predicted Doppler spectrum information for a terminal device and transmitting that information to the terminal device. The server may form a part of the element 112 of FIG. 1 while the terminal device may be one of the terminal devices 100, 102 of FIG. 1. The terminal device is assumed to be configured to perform beamforming in reception and/or transmission. In some embodiments, the server may be replaced by another computing device.

Referring to FIG. 6, the server carries out, in block 601, operations described in reference to blocks 501 to 502 of FIG. 5 for calculating a predicted Doppler spectrum. Then, in a manner similar to that of block 503 of FIG. 5, the server transmits, in message 602, to the terminal device, predicted Doppler spectrum information comprising at least information on one or more peaks of the predicted Doppler spectrum resulting from reflections from one or more devices under control of the digital twin. In one example, the information on the one or more peaks may include at least n Doppler frequencies $f_1, \ldots, f_n$ (n being a positive integer).

The terminal device receives, in block 603, the predicted Doppler spectrum information (i.e., at least the n Doppler frequencies $f_1, \ldots, f_n$). The terminal device carries out, in block 603, the actions described in connection with blocks 302 to 304 of FIG. 3 or blocks 402 to 405 of FIG. 4 for deriving a filtered measured Doppler spectrum and optionally zero or more relevant peaks thereof. However, instead of adjusting the beam refinement interval thereafter, the terminal device determines, in block 604, based on a filtered measured Doppler spectrum (or the zero or more peaks thereof) that performing beam refinement interval adjustment is not necessary in this case. Namely, the terminal device determines, in block 604, that any peaks found in the filtered measured Doppler spectrum correspond here to Doppler frequencies which are already known to the terminal device and which have already been taken into account in a previous adjustment of the beam refinement interval. Thus, no new relevant information in view of beam refinement interval adjustments is attainable from the filtered measured Doppler spectrum. It may be assumed here that the terminal device maintains, in a memory, information on a previous filtered measured Doppler spectrum or at least information on one or more peaks thereof (e.g., amplitudes and/or Doppler frequencies).

The terminal device transmits and/or receives, in block 605, one or more data radio signals using a current beam until the beam refinement interval expires. The information on the current beam may be assumed to be maintained in a memory of the terminal device.

Upon expiration of the beam refinement interval, the terminal device performs, in block 606, beam refinement. The performing of beam refinement may include, for example, performing (signal strength) measurements using a plurality of beams of the terminal device or a subset thereof (e.g., a predefined number of beams closest to the current beam) and selecting a beam for transmission or reception based on results of the measurements. The beam refinement interval may be maintained in the memory of the terminal device. Actions described in connection with blocks 605 and 606 may be repeated multiple times before moving on to block 607.

The server carries out, in block 607, operations described in reference to blocks 501 to 502 of FIG. 5 for calculating a predicted Doppler spectrum and transmits, in message 608, to the terminal device, predicted Doppler spectrum information comprising at least information on one or more peaks of the predicted Doppler spectrum, similar to block 503 of FIG. 5. In an example, information on the one or more peaks may include at least the n Doppler frequencies $f_1, \ldots, f_n$ which were previously transmitted as a part of message 602. In other words, no significant change in view of the Doppler spectrum has occurred in the physical environment and consequently in the virtual environment representing the physical environment.

The terminal device receives, in block 609, the predicted Doppler spectrum information (i.e., at least the n Doppler frequencies $f_1, \ldots, f_n$). The terminal device carries out, in block 609, operations described in reference to blocks 302 to 304 of FIG. 3 or blocks 402 to 405 of FIG. 4 for deriving a filtered measured Doppler spectrum and optionally one or more relevant peaks thereof. In this case, it is determined by the terminal device that one of the peaks of the filtered measured Doppler spectrum having a positive Doppler frequency $f_{n+1}$ was not present in the filtered measured Doppler spectrum derived previously in block 603. The positive Doppler frequency $f_{n+1}$ may be higher (and/or have greater magnitude) than any of the Doppler frequencies of the peaks in the previous filtered measured Doppler spectrum (and thus highly relevant in view of the adjusting of the beam refinement interval). Consequently, to take into account the new Doppler component, the terminal device adjusts, in block 610, the beam refinement interval based at least on the Doppler frequency $f_{n+1}$ of the newly discovered Doppler component (or equally newly discovered peak). The terminal device may store the adjusted beam refinement interval to the memory.

The terminal device transmits, in message 611, at least the Doppler frequency $f_{n+1}$ to the server.

In some embodiments, the transmission of message 611 may be omitted.

The server receives, in block 612, the transmitted Doppler frequency $f_{n+1}$. The server may store the information received in block 612 to a memory. Additionally or alternatively, the server may transmit information on the Doppler frequency $f_{n+1}$ to one or more other terminal devices located within the physical environment over at least one communication network and/or at least one communication link.

Thereafter, the terminal device again transmits and/or receives, in block 613, one or more data radio signals using the current beam. The information on the current beam is assumed to be maintained in a memory of the terminal device. Upon expiration of the new (shorter) beam refinement interval, the terminal device performs, in block 614, beam refinement.

In some embodiments, the relative order between the transmission and/or reception step 605/613 and the beam refinement step 606, 614 may be reversed.

While FIG. 6 illustrates exemplary signaling between a server maintaining a digital twin for a physical (radio) environment and a terminal device located in the physical (radio) environment, a similar process may be carried out, according to other embodiments, between the server and an access node located in the physical (radio) environment for calculating predicted Doppler spectrum information for the access node and transmitting the information to the access node. The discussion provided with reference to FIG. 6 applies, mutatis mutandis, for this alternative scenario.

The blocks, related functions, and information exchanges described in reference to FIGS. 3 to 6 are in no absolute chronological order, and some of them may be performed simultaneously or in an order differing from the given one. In some embodiments, some of the steps may be neglected, for example, if the relevant information is already available (e.g., stored to a memory). In other embodiments, some of the steps might be repeated multiple times before the next step is performed (e.g., steps 603 to 606 can be executed multiple times before 607).

Figure 7:
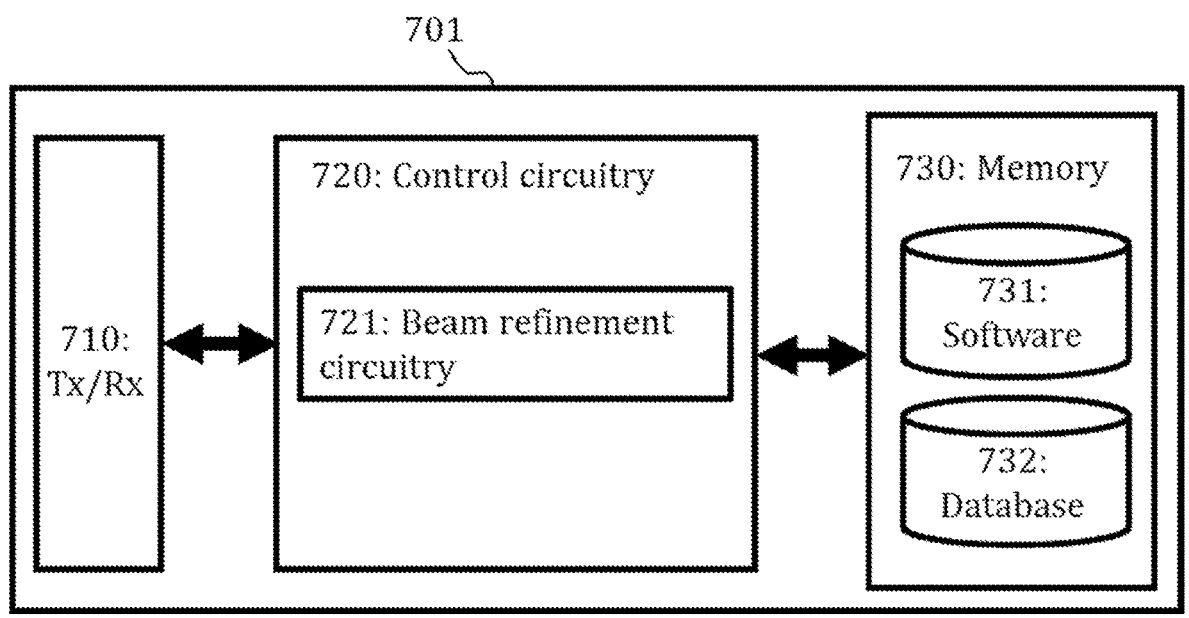
FIGS. 7 and 8 illustrate example apparatuses in accordance with the present disclosure.

FIG. 7 illustrates an apparatus 701 configured to carry out operations described in connection with a terminal device or an apparatus comprised in or connected to a terminal device or an access node or an apparatus comprised in or connected to an access node. The terminal device in question may correspond to any of the terminal devices 100, 102 of FIG. 1 while the access node in question may correspond to the access node 104 of FIG. 1. The apparatus 701 may be an electronic device comprising electronic circuitries. The apparatus may be a separate network entity or a plurality of separate entities.

The apparatus 701 may include communication control circuitry 720, such as at least one processor, and at least one memory 730 including a computer program code (software) 731 wherein the at least one memory 730 and the computer program code (software) 731 are configured, with the at least one processor 720, to cause the apparatus 701 to carry out any one of the embodiments of the terminal device or the apparatus for the terminal device or the access node or the apparatus for the access node described in reference to any of FIGS. 3 to 6.

The memory 730 includes a database 732. The database 732 may include information on, for example, one or more beams, beam refinement interval, one or more known Doppler frequencies, one or more measured Doppler spectra and/or one or more filtered measured Doppler spectra.

Referring to FIG. 7, the control circuitry 720 may include beam refinement circuitry 721. The beam refinement circuitry 721 may be configured, for example, to carry out at any of the processes of FIGS. 3 and 4 and/or any of the processes performed by the terminal device in FIG. 6.

The apparatus 701 further includes communication interfaces (Tx/Rx) 710 comprising hardware and/or software for realizing communication connectivity according to one or more communication protocols. The communication interface may provide the apparatus 701 with communication capabilities to communicate in the cellular network and with a computing device or server running a digital twin (e.g., via the Internet). The communication interface 710 may include standard well-known components such as an amplifier, filter, frequency-converter, (de)modulator, and encoder/decoder circuitries and one or more antennas (or one or more antenna arrays). The communication interfaces 710 may include radio interface components providing the apparatus with radio communication capability in the cell.

Figure 8:
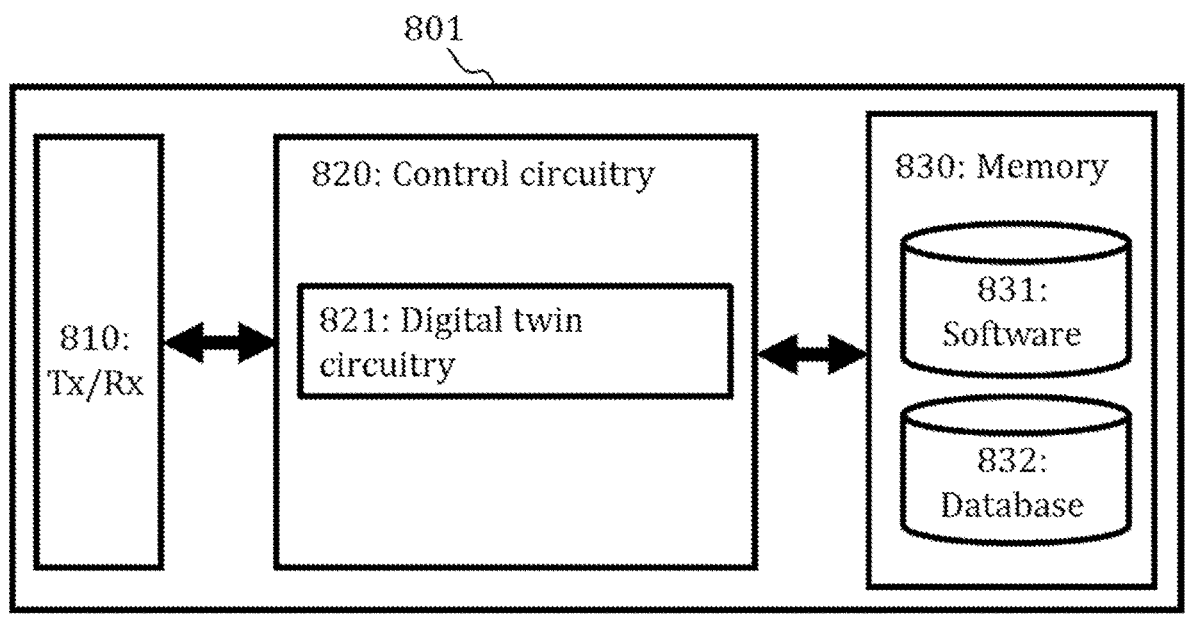

FIG. 8 illustrates an apparatus 801 configured to carry out the functions described in reference to an apparatus for running or maintaining a digital twin. The apparatus may be, e.g., a computing device or a server. The apparatus 801 may be an electronic device comprising electronic circuitries. The apparatus 801 may be a separate network entity or a plurality of separate entities.

The apparatus 801 may include control circuitry 820 such as at least one processor, and at least one memory 830 including a computer program code (software) 831 wherein the at least one memory 830 and the computer program code (software) 831 are configured, with the at least one processor 820, to cause the apparatus 801 to carry out any one of the embodiments of the apparatus for running or maintaining a digital twin described in reference to any of FIGS. 5 to 6.

The memory 830 includes a database 832. The database 832 may include, for example, any information described in connection with block 501 of FIG. 5.

Referring to FIG. 8, the control circuitry 820 may include digital twin circuitry 821 configured to maintain a digital twin for a physical (radio) environment and perform predictions (e.g., simulations) using the digital twin according to any of the presented embodiments. The digital twin circuitry 821 may be configured to carry out at least some of actions relating to FIG. 5 and/or any of the actions of the server in FIG. 6.

The apparatus 801 further includes communication interfaces (Tx/Rx) 810 comprising hardware and/or software for realizing communication connectivity according to one or more communication protocols. The communication interface may provide the apparatus 801 with communication capabilities to communicate with one or more terminal devices of a cellular network (e.g., via the Internet). The communication interface 810 may include standard well-known components such as an amplifier, filter, frequency-converter, (de)modulator, and encoder/decoder circuitries and one or more antennas (or one or more antenna arrays).

The memories of the apparatuses 701, 801 described in relation to FIGS. 7 and 8 may be implemented using any suitable data storage technology, such as semiconductor-based memory devices, flash memory, magnetic memory devices and systems, optical memory devices and systems, fixed memory and removable memory.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

In an embodiment, at least some of the processes described in connection with FIGS. 3 to 6 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, random access memory (RAM), read-only memory (ROM), software, firmware, display, user interface, display circuitry, user interface circuitry, user interface software, display software, circuit, antenna, antenna circuitry, and circuitry. In an embodiment, the at least one processor, the memory, and the computer program code form processing means or includes one or more computer program code portions for carrying out one or more operations according to any one of the embodiments of FIGS. 3 to 6 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described herein may also be carried out in the form of a computer process defined by a computer program or portions thereof. Embodiments of the methods described in connection with FIGS. 3 to 6 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, electrical read-only memory, carrier signal, telecommunications signal, and software distribution package, for example. The computer program medium may be a non-transitory medium. Coding of software for carrying out the embodiments as shown and described is well within the scope of a person of ordinary skill in the art.

The term "non-transitory," as used herein, is a limitation of the medium itself (i.e., tangible, not a signal) as opposed to a limitation on data storage persistency (e.g., RAM vs. ROM).

An example access architecture, such as example architecture illustrated in FIG. 1, to which the examples of the present disclosure may be applied includes, but not limited to, a radio access architecture based on long term evolution advanced (LTE Advanced, LTE-A) or new radio (NR, 5G). It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), wideband code division multiple access (WCDMA), systems using ultra-wideband (UWB) technology, sensor networks, mobile ad-hoc networks (MANETs) and Internet Protocol multimedia subsystems (IMS) or any combination thereof.

In the present disclosure, different exemplifying embodiments are described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

As described herein in reference to FIG. 1 and elsewhere, a communication system may include more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of the communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g) NodeB, a connection is provided to an antenna unit (such as antenna unit 106 described in reference to FIG. 1) that establishes bi-directional radio links to user devices. The antenna unit may comprise a plurality of antennas or antenna elements, as well as circuitry dedicated to beamforming and beam steering. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be nearly exclusively an uplink device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that user devices (such as user devices of FIG. 1) are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors, and real-time control. 5G is expected to have multiple radio interfaces, namely below 6 GHz, cmWave and mmWave, and be integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave-mmWave). One of the concepts considered to be used in 5G networks is network slicing in which multiple independent and dedicated virtual sub-networks (network instances) may be created within the same infrastructure to run services that have different requirements on latency, reliability, throughput, and mobility.

The current architecture in LTE networks is fully distributed in the radio and fully centralized in the core network. The low latency applications and services in 5G require bringing the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets, and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet (depicted, for example, in FIG. 1 using element 112), or utilize services provided by them. The communication network may also be able to support the usage of cloud services, for example at least part of core network operations may be carried out as a cloud service (this is depicted, for example, in FIG. 1 by "cloud" 114). The communication system may also comprise a central control entity, or a like, providing facilities for networks of different operators to cooperate, for example, in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes, or hosts. Application of cloudRAN architecture enables radio access network (RAN) real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even may not yet exist. Technological advancements, such as Big Data and all-IP, may change the way networks are constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g) NodeBs, the user device may have access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g) NodeBs has been introduced. Typically, a network which is able to use "plug-and-play" (e/g) Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G will include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

Even though the invention has been described herein with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A first apparatus comprising:
  at least one processor; and
  at least one memory including computer program code;
  the at least one memory and the computer program code configured to, with the at least one processor, cause the first apparatus at least to perform:
  obtaining predicted Doppler spectrum information for a propagation channel between a first terminal device and one of an access node or a second terminal device calculated using a radio-aware digital twin for a physical environment, wherein the physical environment comprises the first terminal device, the one of the access node or the second terminal device and one or more terminal devices capable of movement under control of the radio-aware digital twin and the predicted Doppler spectrum information includes at least information on one or more Doppler frequencies of a predicted Doppler spectrum resulting from reflections from at least one of the one or more terminal devices;
  causing performing of measurements of one or more reference signals by a device associated with the propagation channel over the propagation channel to form a channel estimate, wherein the device associated with the propagation channel is the first terminal device or the one of the access node or the second terminal device;
  calculating a measured Doppler spectrum based on the channel estimate;
  filtering out the one or more Doppler frequencies of the predicted Doppler spectrum from the measured Doppler spectrum; and
  adjusting a beam refinement interval of the device associated with the propagation channel based on the filtered measured Doppler spectrum or at least a part thereof.

2. The first apparatus of claim 1, wherein the predicted Doppler spectrum information for the propagation channel further includes information on a Doppler frequency of the predicted Doppler spectrum corresponding to a line-of-sight communication path and the at least one memory and the computer program code are configured to, with the at least one processor, further cause the first apparatus to perform, before the adjusting:

filtering out the Doppler frequency of the predicted Doppler spectrum corresponding to the line-of-sight communication path from the measured Doppler spectrum.

3. The first apparatus of claim 1, wherein the one or more Doppler frequencies correspond to one or more peaks of the predicted Doppler spectrum.

4. The first apparatus of claim 3, wherein the at least one memory and the computer program code are configured to, with the at least one processor, further cause the first apparatus to perform:
   detecting, from the filtered measured Doppler spectrum, one or more peaks having a non-negative Doppler frequency; and
   performing the adjusting of the beam refinement interval based on all or at least one of the one or more peaks of the filtered measured Doppler spectrum having the non-negative Doppler frequency.

5. The first apparatus of claim 4, wherein the at least one memory and the computer program code are configured to, with the at least one processor, cause the first apparatus to perform the detecting of the one or more peaks so that the one or more peaks includes any peaks having a non-negative Doppler frequency and satisfying one or more predefined peak detection criteria, the one or more predefined peak detection criteria comprising a predefined minimum level for an amplitude of a peak and/or one or more predefined minimum levels for one or more normalized amplitudes of a peak, the one or more normalized amplitudes being normalized with an amplitude of a peak of the filtered measured Doppler spectrum corresponding to zero Doppler frequency or with a level of a noise floor of the filtered measured Doppler spectrum.

6. The first apparatus of claim 5, wherein the at least one memory and the computer program code are configured to, with the at least one processor, further cause the first apparatus to perform the adjusting of the beam refinement interval based at least on a highest Doppler frequency among the one or more peaks of the filtered measured Doppler spectrum.

7. The first apparatus according to claim 5, wherein the at least one memory and the computer program code are configured to, with the at least one processor, cause the first apparatus to perform the adjusting of the beam refinement interval based on one or more Doppler frequencies of the one or more peaks of the filtered measured Doppler spectrum and/or one or more amplitudes of the one or more peaks of the filtered measured Doppler spectrum.

8. The first apparatus according to claim 1, wherein the obtaining of the predicted Doppler spectrum information includes receiving the predicted Doppler spectrum information from a second apparatus over at least one communication network and/or at least one communication link.

9. The first apparatus according to claim 1, wherein the obtaining of the predicted Doppler spectrum information includes receiving the predicted Doppler spectrum information from a second apparatus over at least one communication network and/or at least one communication link and the at least one memory and the computer program code are configured to, with the at least one processor, further cause the first apparatus to perform:
   causing transmitting information on all or at least one of the one or more peaks of the filtered measured Doppler spectrum to the second apparatus over the at least one communication network and/or the at least one communication link.

10. The first apparatus according to claim 9, wherein the information on the all or at least one of the one or more peaks of the filtered measured Doppler spectrum transmitted to the second apparatus includes one or more Doppler frequencies of one or more respective peaks of the filtered measured Doppler spectrum.

11. The first apparatus according to claim 1, wherein the at least one memory and the computer program code are configured to, with the at least one processor, further cause the first apparatus to perform:
   performing beam refinement for the device associated with the propagation channel according to the beam refinement interval.

12. The first apparatus according to claim 1, wherein the one or more reference signals include one or more demodulation reference signals, one or more channel state information reference signals, one or more positioning reference signals and/or one or more sounding reference signals.

13. A method comprising:
   obtaining predicted Doppler spectrum information for a propagation channel between a first terminal device and one of an access node or a second terminal device calculated using a radio-aware digital twin for a physical environment, wherein the physical environment comprises the first terminal device, the one of the access node or the second terminal device and one or more terminal devices capable of movement under control of the radio-aware digital twin and the predicted Doppler spectrum information includes at least information on one or more Doppler frequencies of a predicted Doppler spectrum resulting from reflections from at least one of the one or more terminal devices;
   causing performing of measurements of one or more reference signals by a device associated with the propagation channel over the propagation channel to a form a channel estimate, wherein the device associated with the propagation channel is the first terminal device or the one of the access node or the second terminal device;
   calculating a measured Doppler spectrum based on the channel estimate;
   filtering out the one or more Doppler frequencies of the predicted Doppler spectrum from the measured Doppler spectrum; and
   adjusting a beam refinement interval of the device associated with the propagation channel based on the filtered measured Doppler spectrum or at least a part thereof.

14. The method of claim 13, wherein the predicted Doppler spectrum information for the propagation channel further includes information on a Doppler frequency of the predicted Doppler spectrum corresponding to a line-of-sight communication path and the at least one memory and the computer program code are configured to, with the at least one processor, further cause the first apparatus to perform, before the adjusting:
   filtering out the Doppler frequency of the predicted Doppler spectrum corresponding to the line-of-sight communication path from the measured Doppler spectrum.

15. The method of claim 13, wherein the one or more Doppler frequencies correspond to one or more peaks of the predicted Doppler spectrum.

16. The method of claim 13 further comprising:
   detecting, from the filtered measured Doppler spectrum, one or more peaks having a non-negative Doppler frequency; and
   performing the adjusting of the beam refinement interval based on all or at least one of the one or more peaks of the filtered measured Doppler spectrum having the non-negative Doppler frequency.

17. The method of claim 16, further comprising the detecting of the one or more peaks so that the one or more peaks includes any peaks having a non-negative Doppler frequency and satisfying one or more predefined peak detection criteria, the one or more predefined peak detection criteria comprising a predefined minimum level for an amplitude of a peak and/or one or more predefined minimum levels for one or more normalized amplitudes of a peak, the one or more normalized amplitudes being normalized with an amplitude of a peak of the filtered measured Doppler spectrum corresponding to zero Doppler frequency or with a level of a noise floor of the filtered measured Doppler spectrum.

* * * * *